(12) United States Patent
Wakabayashi et al.

(10) Patent No.: US 10,611,267 B2
(45) Date of Patent: Apr. 7, 2020

(54) TEMPERATURE INCREASING SYSTEM FOR VEHICLE BATTERIES

(71) Applicant: SUBARU CORPORATION, Tokyo (JP)

(72) Inventors: Kenta Wakabayashi, Tokyo (JP); Fumiyuki Moriya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 58 days.

(21) Appl. No.: 15/788,624

(22) Filed: Oct. 19, 2017

(65) Prior Publication Data
US 2018/0147954 A1 May 31, 2018

(30) Foreign Application Priority Data

Nov. 29, 2016 (JP) .................................. 2016-231297

(51) Int. Cl.
*B60L 58/27* (2019.01)
*B60L 58/20* (2019.01)
*B60L 58/12* (2019.01)

(52) U.S. Cl.
CPC .............. *B60L 58/27* (2019.02); *B60L 58/12* (2019.02); *B60L 58/20* (2019.02);
(Continued)

(58) Field of Classification Search
None
See application file for complete search history.

(56) References Cited

U.S. PATENT DOCUMENTS 8,884,191 B2 * 11/2014 Ogino ................ B60H 1/00271
219/202
2005/0274705 A1 * 12/2005 Zhu ........................ B60L 3/0046
219/202
(Continued)

FOREIGN PATENT DOCUMENTS

JP 2004-336832 A 11/2004
JP 2004336832 * 11/2004
(Continued)

OTHER PUBLICATIONS

Japanese Office Action, dated Sep. 18, 2018, in Japanese Application No. 2016-231297 and English Translation thereof.

*Primary Examiner* — Yuen Wong
*Assistant Examiner* — Hongye Liang
(74) *Attorney, Agent, or Firm* — McGinn IP Law Group, PLLC (57) ABSTRACT

A temperature increasing system for vehicle batteries includes a drive motor, first and second batteries, first and second temperature increasing units, and a controller. The drive motor can output a driving force for driving a drive wheel of a vehicle. The first battery can supply electric power to the drive motor. The second battery has a capacity smaller than a capacity of the first battery. The first and second temperature increasing units can increase, respectively, the temperatures of the first and second batteries by using electric power from the second battery. While the vehicle is parked, the controller heats the first battery by using the first temperature increasing unit if the temperature of the first battery is below a first value when the vehicle starts moving, and heats the second battery by using the second temperature increasing unit.

20 Claims, 7 Drawing Sheets

(52) U.S. Cl.
CPC ....... *B60L 2240/36* (2013.01); *B60L 2240/54* (2013.01); *B60L 2240/545* (2013.01); *B60L 2250/22* (2013.01); *B60L 2260/22* (2013.01); *Y02T 10/7005* (2013.01)

(56) References Cited

U.S. PATENT DOCUMENTS

2006/0016793 A1\* 1/2006 Zhu .................. B60L 58/27
219/205
2017/0101110 A1\* 4/2017 Yoo ................. B60W 10/18

FOREIGN PATENT DOCUMENTS

| JP | 2010-093883 A | 4/2010 |
| JP | 2014-225942 A | 12/2014 |

\* cited by examiner

TEMPERATURE INCREASING SYSTEM FOR VEHICLE BATTERIES

CROSS-REFERENCE TO RELATED APPLICATIONS

The present application claims priority from Japanese Patent Application No. 2016-231297 filed on Nov. 29, 2016, the entire contents of which are hereby incorporated by reference.

BACKGROUND

1. Technical Field

The present invention relates to a temperature increasing system for vehicle batteries.

2. Related Art

In recent years, in known electric vehicles (EVs) and hybrid electric vehicles (HEVs), drive motors have been provided as drive sources for driving drive wheels of the vehicles. In such a vehicle, a battery that can supply electric power to a drive motor is installed, and the battery is charged with electric power to be supplied to the drive motor. The performance of the battery depends on temperature and is more likely to be degraded at low temperature than at normal temperature. Specifically, in accordance with a decrease in the temperature of the battery, the internal resistance of the battery is increased. Thus, the capacity and output can be decreased. Accordingly, in order to prevent degradation in the performance of the battery to be installed in the vehicle, a technique to warm up the battery has been proposed.

For example, Japanese Unexamined Patent Application Publication (JP-A) No. 2010-093883 discloses a technique for performing temperature increasing control to increase the temperature by periodically repeating charging and discharging of the battery when the temperature of the battery detected by a temperature sensor is lower than a predetermined temperature. According to this temperature increasing control, Joule heat is generated in the battery by using the internal resistance of the battery, thereby increasing the temperature of the battery.

In an extremely cold environment such as in a cold area or the like, while a vehicle is parked, the temperature of a battery may fall below the minimum operating temperature. In such a case, the battery is not operable. Accordingly, before the vehicle starts moving, the battery needs to be warmed up so that the temperature of the battery becomes higher than or equal to the minimum operating temperature. Now, in the technique disclosed in JP-A No. 2010-093883, for example, the battery is controlled to be operated when increasing the temperature of the battery. Thus, if the temperature of the battery falls below the minimum operating temperature while the vehicle is parked, it is difficult to warm up the battery before the vehicle starts moving. It is possible to maintain the temperature of the battery to be higher than or equal to the minimum operating temperature by continuously performing temperature increasing control on the battery while the vehicle is parked in a cold environment. However, since the electric power of the battery may be run out, such temperature increasing control is difficult.

The present invention has been made in view of the above. It is desirable to provide a temperature increasing system for vehicle batteries that can more reliably warm up a battery that can supply electric power to a drive motor in a cold environment.

SUMMARY OF THE INVENTION

An aspect of the present invention provides a temperature increasing system for vehicle batteries, including a drive motor, a first battery, a second battery, a first temperature increasing unit, a second temperature increasing unit, and a controller. The drive motor is capable of outputting a driving force for driving a drive wheel of a vehicle. The first battery is capable of supplying electric power to the drive motor. The second battery has a capacity that is smaller than a capacity of the first battery. The first temperature increasing unit is capable of increasing a temperature of the first battery by using electric power from the second battery. The second temperature increasing unit is capable of increasing a temperature of the second battery by using the electric power from the second battery. The controller is configured to increase the temperature of the first battery by using the first temperature increasing unit if, while the vehicle is parked, it is determined that the temperature of the first battery is lower than a first value at a time when the vehicle starts moving, and increase the temperature of the second battery by using the second temperature increasing unit if, while the vehicle is parked, it is determined that the temperature of the second battery is lower than a second value.

Another aspect of the present invention provides a temperature increasing system for vehicle batteries, including a drive motor, a first battery, a second battery, a first temperature increasing unit, a second temperature increasing unit, and circuitry. The drive motor is capable of outputting a driving force for driving a drive wheel of a vehicle. The first battery is capable of supplying electric power to the drive motor. The second battery has a capacity that is smaller than a capacity of the first battery. The first temperature increasing unit is capable of increasing a temperature of the first battery by using electric power from the second battery. The second temperature increasing unit is capable of increasing a temperature of the second battery by using the electric power from the second battery. The circuitry is configured to increase the temperature of the first battery by using the first temperature increasing unit if, while the vehicle is parked, it is determined that the temperature of the first battery is lower than a first value at a time when the vehicle starts moving, and increase the temperature of the second battery by using the second temperature increasing unit if, while the vehicle is parked, it is determined that the temperature of the second battery is lower than a second value

DETAILED DESCRIPTION

Now, an example of the present invention will be described below in detail with reference to the attached drawings. Note that components having substantially the same functional configurations will be denoted by the same reference numerals, and repeated description will be omitted in the specification and the drawings.

1. Summary of Vehicle

Figure 1:
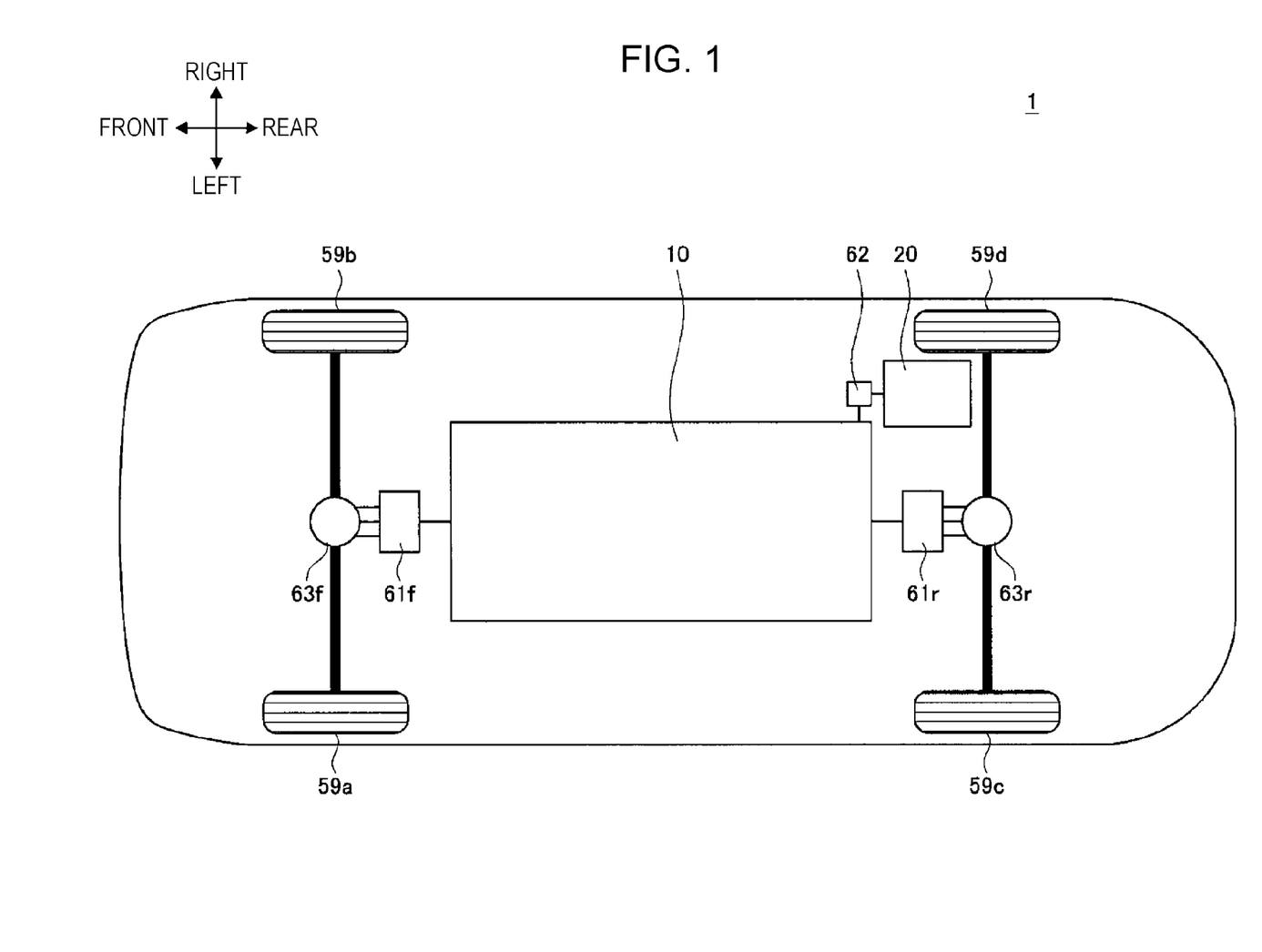
FIG. 1 schematically illustrates an exemplary schematic configuration of a drive system of a vehicle according to an example of the present invention.
Figure 2:
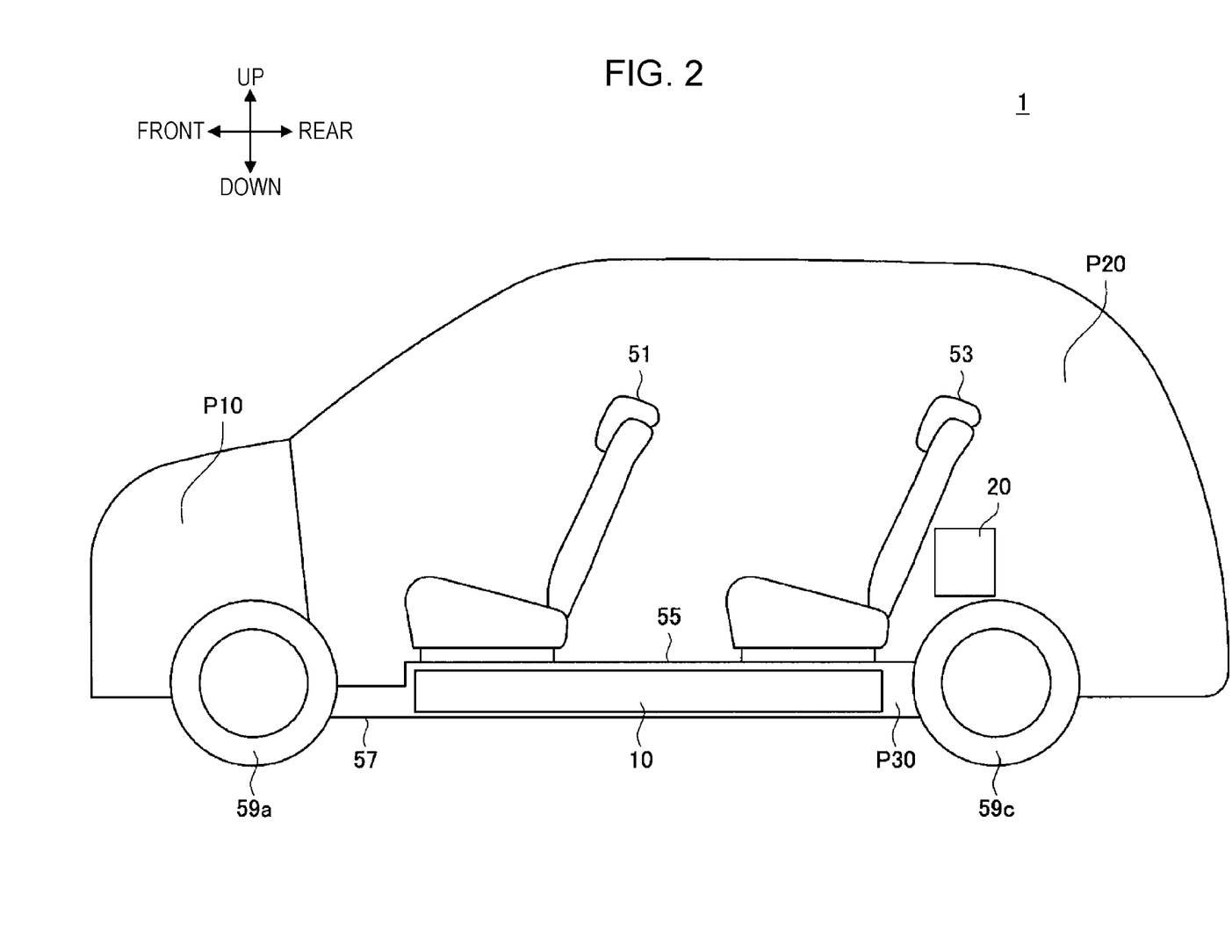
FIG. 2 schematically illustrates exemplary positions of batteries in the vehicle according to the example.

First, the summary of a vehicle 1 according to the example of the present invention will be described with reference to FIGS. 1 and 2. FIG. 1 schematically illustrates an exemplary schematic configuration of a drive system of the vehicle 1 according to the example. FIG. 2 schematically illustrates exemplary positions of batteries in the vehicle 1 according to the example. As will be described later, a main battery 10 and a sub-battery 20 are installed as batteries in the vehicle 1.

The vehicle 1 is an exemplary vehicle in which a temperature increasing system according to the example is provided. Specifically, as illustrated in FIG. 1, the vehicle 1 is an electric vehicle including drive motors 63$f$ and 63$r$ as drive sources for driving drive wheels 59$a$, 59$b$, 59$c$, and 59$d$. The drive wheels 59$a$, 59$b$, 59$c$, and 59$d$ respectively correspond to a front left wheel, a front right wheel, a rear left wheel, and a rear right wheel of the vehicle 1. Note that the following description will be given on the assumption that the direction in which the vehicle 1 advances is the front direction, the direction opposite to the advancing direction is the rear direction, the left and right directions when facing the advancing direction are the left and right directions, and the vertically up and down directions are the up and down directions.

The drive motor 63$f$ is coupled to the drive wheels 59$a$ and 59$b$ through a reduction gear that is not illustrated, whereas the drive motor 63$r$ is coupled to the drive wheels 59$c$ and 59$d$ through a reduction gear that is not illustrated. In the following description, the drive motors 63$f$ and 63$r$ will also be simply referred to as drive motors 63 unless the drive motors 63$f$ and 63$r$ are especially distinguished from each other. In addition, the drive wheels 59$a$, 59$b$, 59$c$, and 59$d$ will also be simply referred to as drive wheels 59 unless the drive wheels 59$a$, 59$b$, 59$c$, and 59$d$ are especially distinguished from one another.

The drive motors 63 can output a driving force for driving the drive wheels 59 of the vehicle 1. The driving force generated by the drive motor 63$f$ is transferred to the drive wheels 59$a$ and 59$b$ through the reduction gear, whereas the driving force generated by the drive motor 63$r$ is transferred to the drive wheels 59$c$ and 59$d$ through the reduction gear. Each of the reduction gears has a function of converting the driving force that is input from a corresponding one of the drive motors 63 at a predetermined reduction ratio to output the driving force to the corresponding drive wheels 59. This function of each reduction gear is implemented by a gear, for example. Note that the reduction gear may be omitted from the configuration of the vehicle 1, in which case, the drive motor 63$f$ may be directly coupled to each of the drive wheels 59$a$ and 59$b$, and the drive motor 63$r$ may be directly coupled to each of the drive wheels 59$c$ and 59$d$.

The drive motors 63$f$ and 63$r$ are electrically connected to the main battery 10 through inverters 61$f$ and 61$r$. In the following description, the inverters 61$f$ and 61$r$ will also be simply referred to as inverters 61 unless the inverters 61$f$ and 61$r$ are especially distinguished from each other. Direct-current electric power supplied from the main battery 10 is converted to alternating-current electric power by each of the inverters 61 and is supplied to each of the drive motors 63. Thus, each of the drive motors 63 generates a driving force.

The main battery 10 is an electric power supply source of a high voltage (e.g., 350 V). The main battery 10 is coupled to the drive motors 63 through the inverters 61 and, as described above, can supply electric power to the drive motors 63. Note that the main battery 10 corresponds to the first battery according to an example of the present invention, which can supply power to the drive motors 63.

As illustrated in FIG. 2, for example, the main battery 10 is disposed below a portion P30 under the floor of the vehicle 1. Specifically, the main battery 10 is disposed below a floor panel 55 that corresponds to the bottom of a compartment P20 of the vehicle 1 and above a bottom cover 57 that covers the bottom of the vehicle 1. More specifically, the main battery 10 is provided to extend from below a front seat 51 to below a rear seat 53 in the portion P30 under the floor of the vehicle 1.

To allow the vehicle 1 to be able to travel a longer distance, it is possible to install the main battery 10 of a relatively large type in the vehicle 1. In such a case, in order to obtain the compartment P20 with a relatively large space, the portion P30 under the floor of the vehicle 1 may be used as a space for installing the main battery 10, as described above. Note that the portion P30 under the floor of the vehicle 1 is a space with a relatively low heat retaining property. Thus, the temperature of the main battery 10 is easily decreased in a cold environment. Accordingly, to prevent degradation in the performance of the main battery 10, it is considered to be desirable that the main battery 10 be more reliably warmed up. In the example, by providing a temperature increasing system, which will be described later, in the vehicle 1, it becomes possible to more reliably warm up the main battery 10 that can supply electric power to the drive motors 63 in a cold environment. Details of such a temperature increasing system will be described later.

The sub-battery 20 is an electric power supply source of a low voltage (e.g., 12 V). In addition, the capacity of the sub-battery 20 is smaller than the capacity of the main battery 10. The sub-battery 20 is coupled to various apparatuses installed in the vehicle 1 and can supply electric power to the apparatuses. In addition, as illustrated in FIG. 1, for example, the sub-battery 20 is coupled to the main battery 10 through a DC (direct current)-to-DC converter 62 and is charged with electric power supplied from the main battery 10. Specifically, electric power that is output from the main battery 10 is subjected to voltage step down performed by the DC-to-DC converter 62 and supplied to the sub-battery 20. Note that the sub-battery 20 corresponds to the second battery according to an example of the present invention.

As illustrated in FIG. 2, for example, the sub-battery 20 is disposed in the compartment P20 of the vehicle 1. Specifically, the sub-battery 20 is disposed behind the rear seat 53 in the compartment P20 of the vehicle 1. Note that the compartment P20 corresponds to a space whose heat retaining property is higher than the heat retaining property of the portion P30 under the floor. In this manner, the sub-battery 20 is preferably disposed in a space whose heat retaining property is higher than the heat retaining property of the space in which the main battery 10 is disposed. Note that advantages obtained by disposing the sub-battery 20 in a space whose heat retaining property is relatively high will be described later.

In addition, the sub-battery 20 may be located in an engine room P10, which is a space in front of the compartment P20 in the vehicle 1. If the sub-battery 20 is located in the engine room P10, a container formed of a heat insulation member may be provided in the engine room P10, and the sub-battery 20 may be disposed in the space inside the container. Note that the engine room P10 is a space whose heat retaining property is lower than the heat retaining property of the compartment P20. If the sub-battery 20 is located in such a space whose heat retaining property is relatively low, the sub-battery 20 may be disposed in a space inside a container formed of a heat insulation member. Accordingly, the sub-battery 20 can be disposed in a space whose heat retaining property is higher than the heat retaining property of the space in which the main battery 10 is disposed.

2. Temperature Increasing System

Figure 3:
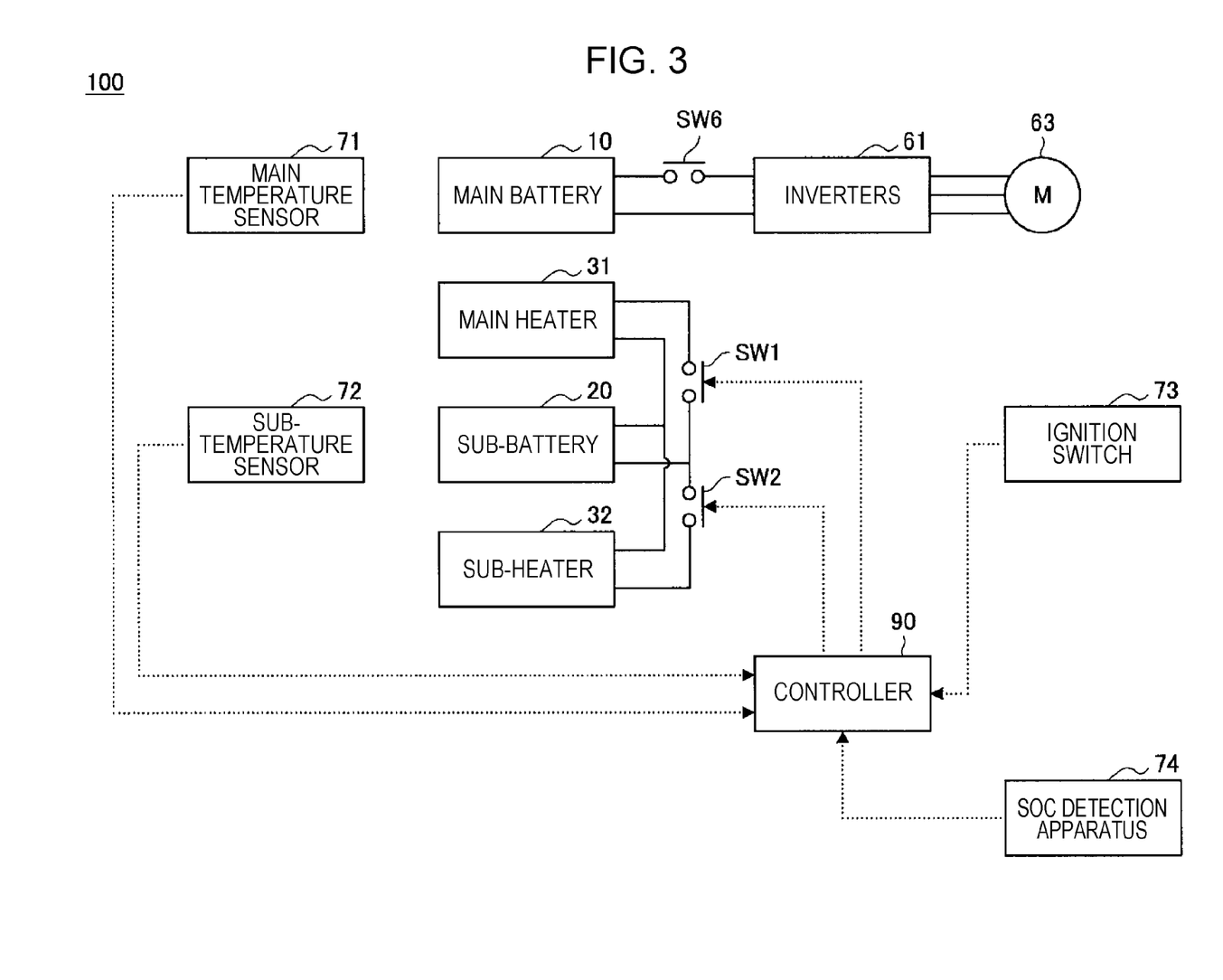
FIG. 3 schematically illustrates an exemplary schematic configuration of a temperature increasing system for a vehicle according to the example.

Next, details of a temperature increasing system 100 according to the example will be described with reference to FIG. 3. The temperature increasing system 100 corresponds to the temperature increasing system for vehicle batteries according to an example of the present invention, which is to be provided in the vehicle 1. FIG. 3 schematically illustrates an exemplary schematic configuration of the temperature increasing system 100 for the vehicle 1 according to the example. Note that in FIG. 3, each electrical connection between apparatuses is represented as a solid line, and the flow of signals is represented as a dashed line.

As illustrated in FIG. 3, the temperature increasing system 100 includes the main battery 10, the sub-battery 20, a main heater 31, a sub-heater 32, the inverters 61, the drive motors 63, a main temperature sensor 71, a sub-temperature sensor 72, an ignition switch 73, a state of charge (SOC) detection apparatus 74, and a controller 90.

As described above, the main battery 10 is coupled to the drive motors 63 through the inverters 61. A system main relay SW6 is provided between the main battery 10 and each of the inverters 61. The operation of the system main relay SW6 is controlled so that the connection status between the main battery 10 and each of the inverters 61 is switched. Specifically, while the system main relay SW6 is in an ON state, the main battery 10 and each of the inverters 61 are electrically connected to each other, and electric power can be supplied to the drive motors 63. In such a state, when a driver performs an accelerating operation, electric power is supplied to the drive motors 63, and the drive motors 63 drive the drive wheels 59. On the other hand, while the system main relay SW6 is in an OFF state, the main battery 10 and each of the inverters 61 are not electrically connected to each other, and electric power cannot be supplied to the drive motors 63.

The operation of the system main relay SW6 is controlled by, for example, another controller other than the controller 90. Specifically, the other controller controls the operation of the system main relay SW6 in accordance with the power source state of the vehicle 1. For example, while the ignition switch 73 is in an OFF state, the power source state of the vehicle 1 becomes a state in which a system related to the drive system is not operated (system-OFF state). During a system-OFF state, if the ignition switch 73 is depressed without a brake pedal being depressed, the power source state of the vehicle 1 becomes an IG-ON state. During a system-OFF state or an IG-ON state, if the ignition switch 73 is depressed with the brake pedal being depressed, the power source state of the vehicle 1 becomes a READY-ON state. Note that the ignition switch 73 is in an ON state during an IG-ON state and a READY-ON state. During a system-OFF state or an IG-ON state, the system main relay SW6 is in an OFF state, and electric power cannot be supplied to the drive motors 63. On the other hand, during a READY-ON state, the system main relay SW6 is in an ON state, and electric power can be supplied to the drive motors 63.

As described above, the sub-battery 20 is a battery whose capacity is smaller than the capacity of the main battery 10. In the example, the sub-battery 20 is coupled to each of the main heater 31 and the sub-heater 32 and can supply electric power to each of the main heater 31 and the sub-heater 32.

The main heater 31 can heat an object around the main heater 31 by using electric power supplied from the sub-battery 20. The main heater 31 can heat an object around the main heater 31 by, for example, generating heat by using resistance heating. Note that the heating method of the main heater 31 is not limited to this instance and may be another method such as a method using dielectric heating. In addition, the main heater 31 is arranged, for example, in parallel to the main battery 10 with a medium flow passage interposed therebetween, in which a medium that can perform heat exchange with the main battery 10 is circulated, and the medium flow passage is provided near the main battery 10. In this case, the main heater 31 can heat the main battery 10 through the medium. Note that the main heater 31 may be provided near the main battery 10. In this case, the main heater 31 can directly heat the main battery 10. In this manner, the main heater 31 can increase the temperature of the main battery 10 by using electric power from the sub-battery 20. Note that the main heater 31 corresponds to the first temperature increasing unit according to an example of the present invention.

As in the main heater 31, the sub-heater 32 can heat an object around the sub-heater 32 by using electric power supplied from the sub-battery 20. The heating method of the sub-heater 32 is not limited to a particular one and may be, for example, a method such as a method using resistance heating or dielectric heating. In addition, for example, the sub-heater 32 is provided near the sub-battery 20. In this case, the sub-heater 32 can directly heat the sub-battery 20. Note that in a case of providing, near the sub-battery 20, a medium flow passage in which a medium that can perform heat exchange with the sub-battery 20 is circulated, the sub-heater 32 may be arranged in parallel to the sub-battery 20 with the medium flow passage interposed therebetween. In this case, the sub-heater 32 can heat the sub-battery 20 through the medium. In this manner, the sub-heater 32 can increase the temperature of the sub-battery 20 by using electric power from the sub-battery 20. Note that the sub-heater 32 corresponds to the second temperature increasing unit according to an example of the present invention.

As illustrated in FIG. 3, the main heater 31 and the sub-heater 32 are each connected in parallel to the sub-battery 20. In addition, a switch SW1 is provided between the sub-battery 20 and the main heater 31, and a switch SW2 is provided between the sub-battery 20 and the sub-heater 32.

The switching of the switch SW1 is controlled so as to switch the connection status between the sub-battery 20 and the main heater 31. Specifically, while the switch SW1 is in an ON state, the sub-battery 20 and the main heater 31 are electrically connected to each other, and electric power is supplied from the sub-battery 20 to the main heater 31. On the other hand, while the switch SW1 is in an OFF state, the sub-battery 20 and the main heater 31 are not electrically connected to each other, and the supply of electric power from the sub-battery 20 to the main heater 31 is stopped. Note that the state in which electric power is supplied from the sub-battery 20 to the main heater 31 will also be hereinafter referred to as a state in which the main heater 31 is in an ON state. In addition, the state in which the supply of electric power from the sub-battery 20 to the main heater 31 is stopped will also be referred to as a state in which the main heater 31 is in an OFF state.

The switching of the switch SW2 is controlled so as to switch the connection status between the sub-battery 20 and the sub-heater 32. Specifically, while the switch SW2 is in an ON state, the sub-battery 20 and the sub-heater 32 are electrically connected to each other, and electric power is supplied from the sub-battery 20 to the sub-heater 32. On the other hand, while the switch SW2 is in an OFF state, the sub-battery 20 and the sub-heater 32 are not electrically connected to each other, and the supply of electric power from the sub-battery 20 to the sub-heater 32 is stopped. Note that the state in which electric power is supplied from the sub-battery 20 to the sub-heater 32 will also be hereinafter referred to as a state in which the sub-heater 32 is in an ON state. In addition, the state in which the supply of electric power from the sub-battery 20 to the sub-heater 32 is stopped will also be referred to as a state in which the sub-heater 32 is in an OFF state.

The switching of the switch SW1 and the switch SW2 is controlled by the controller 90. Thus, the supply of electric power to the main heater 31 and the sub-heater 32 is controlled, and thereby controlling increasing of the temperature of the main battery 10 by using the main heater 31 and increasing of the temperature of the sub-battery 20 by using the sub-heater 32.

Specifically, the controller 90 switches on the switch SW1, thereby switching on the main heater 31 and increasing the temperature of the main battery 10 by using the main heater 31. In addition, the controller 90 switches off the switch SW1, thereby switching off the main heater 31 and stopping increasing the temperature of the main battery 10 by using the main heater 31. In addition, the controller 90 switches on the switch SW2, thereby switching on the sub-heater 32 and increasing the temperature of the sub-battery 20 by using the sub-heater 32. In addition, the controller 90 switches off the switch SW2, thereby switching off the sub-heater 32 and stopping increasing the temperature of the sub-battery 20 by using the sub-heater 32.

The main temperature sensor 71 detects a temperature T1 of the main battery 10 and outputs the detection result. The main temperature sensor 71 is, for example, provided in a housing of the main battery 10.

The sub-temperature sensor 72 detects a temperature T2 of the sub-battery 20 and outputs the detection result. The sub-temperature sensor 72 is, for example, provided in a housing of the sub-battery 20.

The ignition switch 73 accepts an input operation performed by a driver and outputs information indicating the input operation. Specifically, the ignition switch 73 outputs information indicating the history of input operations performed by the driver to the controller 90.

The SOC detection apparatus 74 detects a remaining capacity SOC of the sub-battery 20 and outputs the detection result. The SOC detection apparatus 74 is, for example, provided in the housing of the sub-battery 20.

The controller 90 is formed of a central processing unit (CPU), which is a processing apparatus, a read only memory (ROM), which is a storage device that stores programs, calculation parameters, and the like to be used by the CPU, a random access memory (RAM), which is a storage device that temporarily stores parameters and the like that change as appropriate in the execution of the CPU, and the like.

The controller 90 controls the operation of each apparatus included in the temperature increasing system 100. For example, the controller 90 outputs an operation instruction by using an electric signal to each apparatus that is a control target, thereby controlling the operation of the apparatus. Specifically, the controller 90 controls the switching of the switch SW1 and the switch SW2, thereby performing control to increase the temperature of the main battery 10 by using the main heater 31 and to increase the temperature of the sub-battery 20 by using the sub-heater 32.

In addition, the controller 90 receives information that is output from each apparatus. For example, the controller 90 receives various detection results that are output from the main temperature sensor 71, the sub-temperature sensor 72, and the SOC detection apparatus 74. In addition, the controller 90 receives information indicating an input operation performed by a driver, the information having been output from the ignition switch 73. On the basis of the information indicating the input operation, the controller 90 can determine whether the ignition switch 73 is in an ON or OFF state. The communication between the controller 90 and each apparatus is implemented by using, for example, controller area network (CAN) communication. Note that the functions of the controller 90 according to the example may be divided by a plurality of controllers, in which case, the plurality of controllers may be connected to each other through a communication bus such as a CAN.

While the vehicle 1 is parked, on the basis of the determination that the temperature T1 of the main battery 10 is lower than a first threshold Tth1 at the time the vehicle 1 starts moving, the controller 90 according to the example increases the temperature of the main battery 10 by using the main heater 31. For example, while the vehicle 1 is parked, if it is determined that the temperature T1 of the main battery 10 is lower than the first threshold Tth1 at the time the vehicle 1 starts moving, the controller 90 may increase the temperature of the main battery 10 by using the main heater 31. In other words, while the vehicle 1 is parked, in response to the determination that the temperature T1 of the main battery 10 is lower than the first threshold Tth1 at the time the vehicle 1 starts moving, the controller 90 may increase the temperature of the main battery 10 by using the main heater 31. The first threshold Tth1 is, for example, set to a minimum operating temperature Tlow1 (e.g., −20° C.) of the main battery 10. Note that the first threshold Tth1 is stored in advance in a storage device of the controller 90. In addition, the first threshold Tth1 may be set to another value that is higher than the minimum operating temperature Tlow1.

Specifically, while the vehicle 1 is parked, if it is determined that the temperature T1 of the main battery 10 is lower than the first threshold Tth1 at the time the vehicle 1 starts moving, the controller 90 switches on the switch SW1. Accordingly, electric power is supplied from the sub-battery 20 to the main heater 31. In other words, the main heater 31 is switched on. Thus, the temperature of the main battery 10 can be increased by using the main heater 31.

In the example, the above-described temperature increasing control is performed on the main battery 10, and thereby, warming up of the main battery 10 can be completed before the vehicle 1 starts moving.

For example, on the basis of the temperature T1 being lower than the first threshold Tth1 while the ignition switch 73 is in an ON state, the controller 90 may determine that the temperature T1 of the main battery 10 is lower than the first threshold Tth1 at the time the vehicle 1 starts moving. If the ignition switch 73 is in an ON state, it is highly possible that the vehicle 1 starts moving in the relatively near future. Thus, with the above determination, warming up of the main battery 10 can be appropriately completed before the vehicle 1 starts moving.

Note that the controller 90 may determine that the temperature T1 of the main battery 10 is lower than the first threshold Tth1 at the time the vehicle 1 starts moving on the basis of the temperature T1 being lower than the first threshold Tth1 when it is determined that a driver is in the vehicle 1. For example, the controller 90 may determine whether a driver is in the vehicle 1 on the basis of a detection result that is output from a seat sensor that can detect whether a driver is seated on a driver seat. Alternatively, the controller 90 may determine whether a driver is in the vehicle 1 on the basis of a detection result that is output from a detection apparatus that can detect the distance between a smart key and the vehicle 1. If a driver is in the vehicle 1, it is highly possible that the vehicle 1 starts moving in the relatively near future. Thus, with the above determination, warming up of the main battery 10 can be appropriately completed before the vehicle 1 starts moving.

Alternatively, the controller 90 may determine that the temperature T1 of the main battery 10 is lower than the first threshold Tth1 at the time the vehicle 1 starts moving on the basis of the temperature T1 being lower than the first threshold Tth1 at a time of a predetermined period earlier than a scheduled start-moving time that has been set in advance as a time at which the vehicle 1 starts moving. Here, the scheduled start-moving time is set by, for example, an input operation performed by a driver. In addition, the scheduled start-moving time that has been set is stored in a storage device of the controller 90. Specifically, the predetermined period is set to a period having such a length in which the temperature T1 of the main battery 10 does not change largely. Thus, with the above determination, warming up of the main battery 10 can be appropriately completed before the vehicle 1 starts moving.

While the vehicle 1 is parked, if it is determined that the temperature T2 of the sub-battery 20 is lower than the second threshold Tth2, the controller 90 according to the example increases the temperature of the sub-battery 20 by using the sub-heater 32. Specifically, the second threshold Tth2 is set to a value (e.g., −15° C.) higher than a minimum operating temperature Tlow2 (e.g., −20° C.) of the sub-battery 20. Note that the second threshold Tth2 is stored in advance in a storage device of the controller 90.

Specifically, while the vehicle 1 is parked, if it is determined that the temperature T2 of the sub-battery 20 is lower than the second threshold Tth2, the controller 90 switches on the switch SW2. Accordingly, electric power is supplied from the sub-battery 20 to the sub-heater 32. In other words, the sub-heater 32 is switched on. Thus, the temperature of the sub-battery 20 can be increased by using the sub-heater 32.

In the example, since temperature increasing control is performed on the sub-battery 20, even while the vehicle 1 is parked in a cold environment, the temperature T2 of the sub-battery 20 can be maintained to be higher than or equal to the minimum operating temperature Tlow2. Since the capacity of the sub-battery 20 is smaller than the capacity of the main battery 10, the size of the sub-battery 20 is smaller than the size of the main battery 10. Thus, the power consumption for maintaining the temperature T2 of the sub-battery 20 to be higher than or equal to the minimum operating temperature Tlow2 is less than the power consumption for maintaining the temperature T1 of the main battery 10 to be higher than or equal to the minimum operating temperature Tlow1. In addition, as described above, the temperature of the main battery 10 is increased by using electric power from the sub-battery 20 in the example. Thus, even while the vehicle 1 is parked in a cold environment, the state in which the temperature of the main battery 10 can be increased can be maintained with the power consumption suppressed. Accordingly, it is possible to more reliably warm up the main battery 10 that can supply electric power to the drive motors 63 in a cold environment.

In addition, since the size of the sub-battery 20 is relatively small, the sub-battery 20 can be disposed at any of various locations in the vehicle 1 compared with the main battery 10. Thus, as described above, the sub-battery 20 can be disposed in a space whose heat retaining property is higher than the heat retaining property of a space in which the main battery 10 is disposed. Thus, a decrease in the temperature T2 of the sub-battery 20 can be suppressed. Accordingly, it is possible to reduce the power consumption for maintaining the temperature T2 of the sub-battery 20 to be higher than or equal to the minimum operating temperature Tlow2.

In addition, if it is determined that the temperature T1 of the main battery 10 is lower than the second threshold Tth2, the controller 90 may determine that the temperature T2 of the sub-battery 20 is lower than the second threshold Tth2. Specifically, as described above, the sub-battery 20 is disposed in a space whose heat retaining property is higher than the heat retaining property of a space in which the main battery 10 is disposed. Thus, the temperature T2 of the sub-battery 20 is basically higher than the temperature T1 of the main battery 10. Accordingly, even if the above determination is made, the temperature T2 of the sub-battery 20 can be maintained to be higher than or equal to the minimum operating temperature Tlow2. This can omit the sub-temperature sensor 72 from the configuration of the temperature increasing system 100, in which case, the size of the temperature increasing system 100 can be made smaller.

The minimum operating temperature Tlow2 of the sub-battery 20 may be lower than the minimum operating temperature Tlow1 of the main battery 10. Thus, even if the second threshold Tth2 is set to a low value, the temperature T2 of the sub-battery 20 can be maintained to be higher than or equal to the minimum operating temperature Tlow2, as compared with in a case where the minimum operating temperature Tlow2 is substantially equal to the minimum operating temperature Tlow1 of the main battery 10. This can prevent the temperature T2 of the sub-battery 20 from falling below the second threshold Tth2. Accordingly, it is possible to further reduce the power consumption for maintaining the temperature T2 of the sub-battery 20 to be higher than or equal to the minimum operating temperature Tlow2.

3. Operation

Next, the process flow of the controller 90 according to the example will be described with reference to FIGS. 4 and 5.

3-1. Control Flow

First, a control flow of the controller 90 according to the example will be described with reference to the flowchart illustrated in FIG. 4. FIG. 4 is a flowchart illustrating an exemplary process flow of the controller 90 according to the example. The process illustrated in FIG. 4 may be performed at any time while the vehicle 1 is parked.

Figure 4:
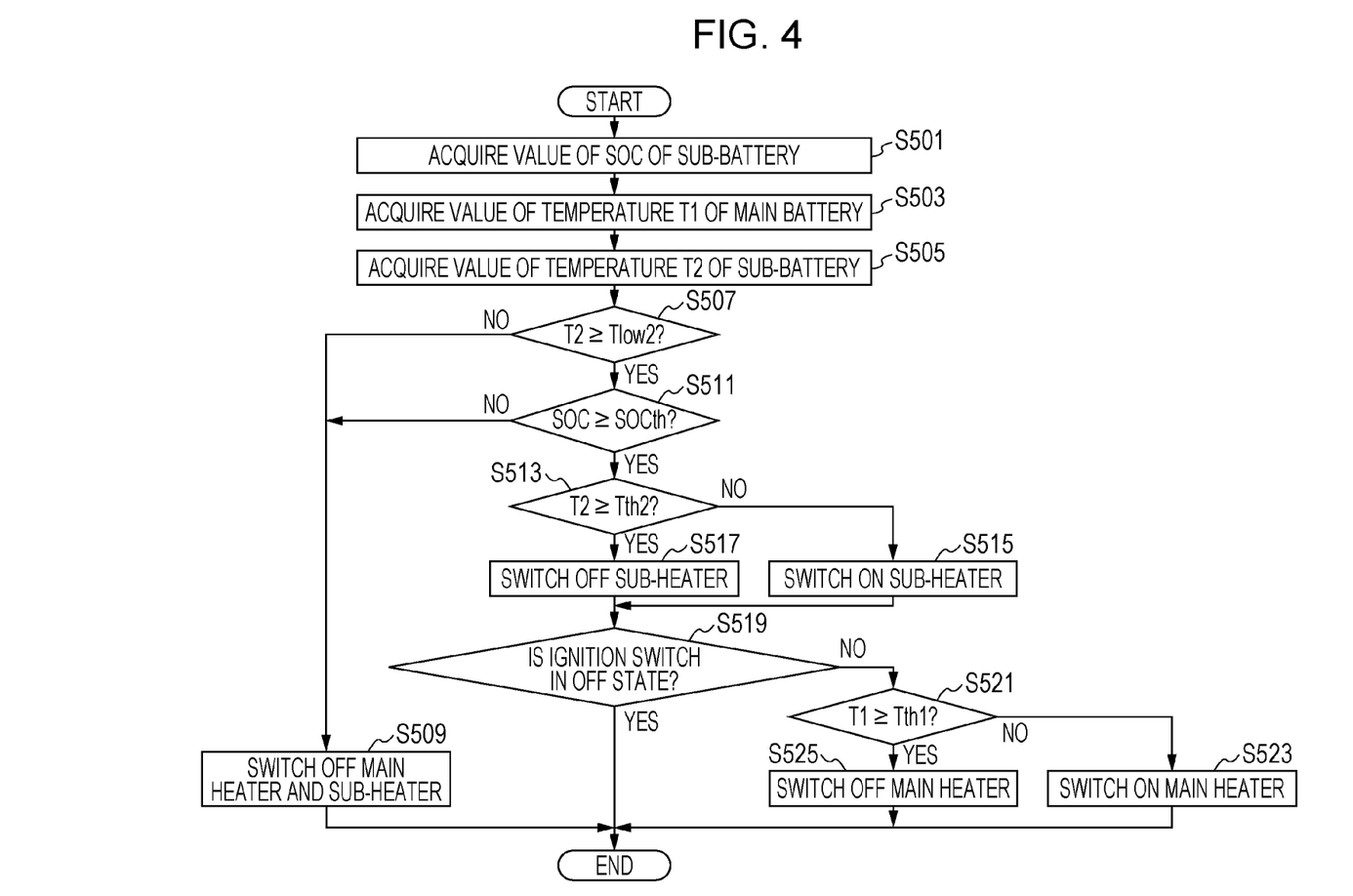
FIG. 4 is a flowchart illustrating an exemplary process flow of a controller according to the example.

As illustrated in FIG. 4, first, the controller 90 acquires the value of the remaining capacity SOC of the sub-battery 20 (step S501). Specifically, on the basis of a detection result that is output from the SOC detection apparatus 74, the controller 90 acquires the value of the remaining capacity SOC of the sub-battery 20. Subsequently, the controller 90 acquires the value of the temperature T1 of the main battery 10 (step S503). Specifically, on the basis of a detection result that is output from the main temperature sensor 71, the controller 90 acquires the value of the temperature T1. Subsequently, the controller 90 acquires the value of the temperature T2 of the sub-battery 20 (step S505). Specifically, on the basis of a detection result that is output from the sub-temperature sensor 72, the controller 90 acquires the value of the temperature T2. Subsequently, the controller 90 determines whether the temperature T2 of the sub-battery 20 is higher than or equal to the minimum operating temperature Tlow2 (step S507).

If it is determined in step S507 that the temperature T2 of the sub-battery 20 is lower than the minimum operating temperature Tlow2 (NO in step S507), the controller 90 switches off the main heater 31 and the sub-heater 32, thereby stopping increasing the temperature of the main battery 10 by using the main heater 31 and stopping increasing the temperature of the sub-battery 20 by using the sub-heater 32 (step S509). Subsequently, the process illustrated in FIG. 4 ends. On the other hand, if it is determined that the temperature T2 of the sub-battery 20 is higher than or equal to the minimum operating temperature Tlow2 (YES in step S507), the controller 90 determines whether the remaining capacity SOC of the sub-battery 20 is larger than or equal to an remaining capacity threshold SOCth (step S511). Note that the remaining capacity threshold SOCth is set to, for example, the minimum remaining capacity SOC (e.g., 5%) with which the sub-battery 20 can be operated, and is stored in advance in a storage device of the controller 90.

If it is determined in step S511 that the remaining capacity SOC of the sub-battery 20 is smaller than the remaining capacity threshold SOCth (NO in step S511), the controller 90 switches off the main heater 31 and the sub-heater 32, thereby stopping increasing the temperature of the main battery 10 by using the main heater 31 and stopping increasing the temperature of the sub-battery 20 by using the sub-heater 32 (step S509). Subsequently, the process illustrated in FIG. 4 ends. On the other hand, if it is determined that the remaining capacity SOC of the sub-battery 20 is larger than or equal to the remaining capacity threshold SOCth (YES in step S511), the controller 90 determines whether the temperature T2 of the sub-battery 20 is higher than or equal to the second threshold Tth2 (step S513).

If it is determined in step S513 that the temperature T2 of the sub-battery 20 is higher than or equal to the second threshold Tth2 (YES in step S513), the controller 90 switches off the sub-heater 32, thereby stopping increasing the temperature of the sub-battery 20 by using the sub-heater 32 (step S517). On the other hand, if it is determined that the temperature T2 of the sub-battery 20 is lower than the second threshold Tth2 (NO in step S513), the controller 90 switches on the sub-heater 32 in order to maintain the temperature T2 to be higher than or equal to the minimum operating temperature Tlow2, thereby increasing the temperature of the sub-battery 20 by using the sub-heater 32 (step S515). After step S517 or step S515, the controller 90 determines whether the ignition switch 73 is in an OFF state (step S519).

If it is determined in step S519 that the ignition switch 73 is in an OFF state (YES in step S519), the process illustrated in FIG. 4 ends. On the other hand, if it is determined that the ignition switch 73 is in an ON state (NO in step S519), the controller 90 determines whether the temperature T1 of the main battery 10 is higher than or equal to the first threshold Tth1 (step S521).

If it is determined in step S521 that the temperature T1 of the main battery 10 is higher than or equal to the first threshold Tth1 (YES in step S521), the controller 90 switches off the main heater 31, thereby stopping increasing the temperature of the main battery 10 by using the main heater 31 (step S525). On the other hand, if it is determined that the temperature T1 of the main battery 10 is lower than the first threshold Tth1 (NO in step S521), the controller 90 determines that the temperature T1 of the main battery 10 is lower than the first threshold Tth1 at the time the vehicle 1 starts moving and switches on the main heater 31, thereby increasing the temperature of the main battery 10 by using the main heater 31 (step S523). After step S525 or step S523, the process illustrated in FIG. 4 ends.

Note that an instance of using the temperature T1 obtained while the ignition switch 73 is in an ON state as the index for determining whether the temperature T1 of the main battery 10 is lower than the first threshold Tth1 at the time the vehicle 1 starts moving has been described above with reference to FIG. 4. However, the index is not limited to this instance, as described above.

3-2. Timing Chart

Next, transition of various quantities of states in a case in which temperature increasing control is performed by the controller 90 according to the example will be described with reference to FIG. 5. FIG. 5 schematically illustrates exemplary transition of each quantity of state in a case in which temperature increasing control is performed by the controller 90 according to the example. Specifically, FIG. 5 schematically illustrates exemplary switching of the ignition switch 73 while the vehicle 1 is parked after stopping traveling and exemplary transition of the temperature T1 of the main battery 10 and the temperature T2 of the sub-battery 20.

While the vehicle 1 is traveling, heat is generated at some portions of the vehicle 1, and accordingly, the main battery 10 and the sub-battery 20 have relatively high temperatures. Thus, as illustrated in FIG. 5, before time t1 at which the ignition switch 73 is switched off after the vehicle 1 has been stopped, the temperature T1 of the main battery 10 and the temperature T2 of the sub-battery 20 are relatively high. On the other hand, after time t1, the temperature T1 of the main battery 10 and the temperature T2 of the sub-battery 20 decrease over time.

Subsequently, at time t2 at which the temperature T2 of the sub-battery 20 falls below the second threshold Tth2, increasing of the temperature of the sub-battery 20 is started by using the sub-heater 32. Subsequently, until time t3 at which the temperature T2 exceeds the second threshold Tth2, increasing of the temperature of the sub-battery 20 is continuously performed by using the sub-heater 32, and at time t3, increasing of the temperature of the sub-battery 20 by using the sub-heater 32 ends. Subsequently, at time t4 at which the temperature T2 of the sub-battery 20 falls below the second threshold Tth2 again, increasing of the temperature of the sub-battery 20 is started again by using the sub-heater 32. Subsequently, until time t5 at which the temperature T2 exceeds the second threshold Tth2, increasing of the temperature of the sub-battery 20 is continuously performed by using the sub-heater 32, and at time t5, increasing of the temperature of the sub-battery 20 by using the sub-heater 32 ends. The temperature increasing control is performed on the sub-battery 20 in the above manner, and thereby the temperature T2 of the sub-battery 20 can be maintained to be higher than or equal to the minimum operating temperature Tlow2.

Figure 5:
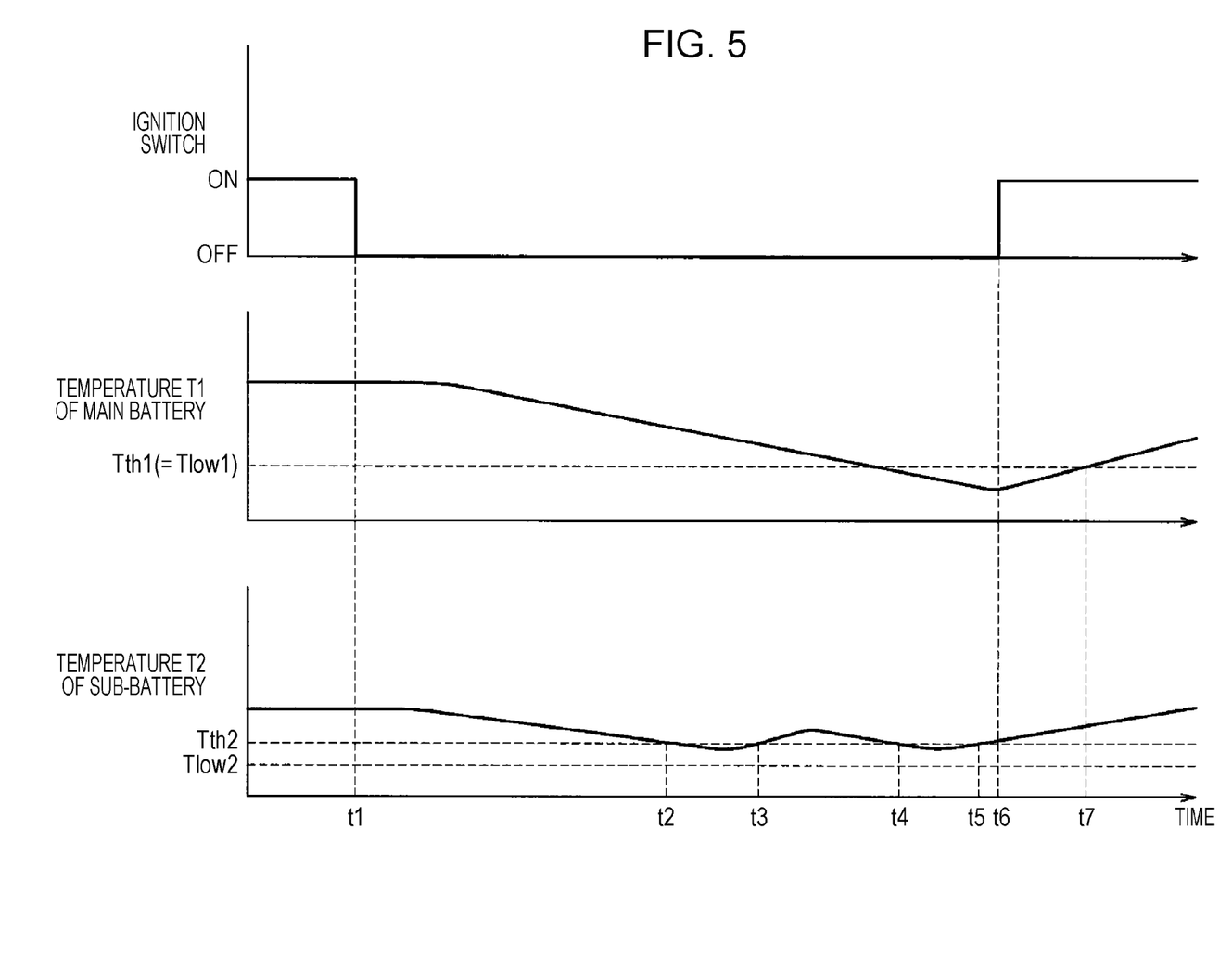
FIG. 5 schematically illustrates exemplary transition of each quantity of state in a case in which temperature increasing control is performed by the controller according to the example.

As illustrated in FIG. 5, if the temperature T1 of the main battery 10 is lower than the first threshold Tth1 at time t6 at which the ignition switch 73 is switched on, increasing of the temperature of the main battery 10 is started by using the main heater 31. Subsequently, until time t7 at which the temperature T1 exceeds the first threshold Tth1, increasing of the temperature of the main battery 10 is continuously performed by using the main heater 31, and at time t7, increasing of the temperature of the main battery 10 by using the main heater 31 ends. The temperature increasing control is performed on the main battery 10 in the above manner, and thereby warming up of the main battery 10 can be completed before the vehicle 1 starts moving.

In the example, even while the vehicle 1 is parked in a cold environment, the state in which the temperature of the main battery 10 can be increased can be maintained with the power consumption suppressed, as illustrated in FIG. 5. Thus, increasing of the temperature of the main battery 10 can be started at time t6 at which the ignition switch 73 is switched on. Accordingly, it is possible to more reliably warm up the main battery 10 that can supply electric power to the drive motors 63 in a cold environment.

4. Application Examples

Next, temperature increasing control according to application examples will be described with reference to FIGS. 6 and 7.

4-1. First Application Example

First, temperature increasing control according to a first application example will be described with reference to FIG. 6.

The temperature increasing control performed by a controller according to the first application example differs from the temperature increasing control performed by the controller 90 of the temperature increasing system 100 that has been described with reference to FIG. 3. Specifically, unlike the above-described controller 90 of the temperature increasing system 100, the controller according to the first application example stops increasing the temperature of the sub-battery 20 by using the sub-heater 32 if, even while the vehicle 1 is parked, it is determined that a driver is getting off the vehicle 1. Thus, the controller according to the first application example increases the temperature of the sub-battery 20 by using the sub-heater 32 if it is determined, while the vehicle 1 is parked, that the temperature T2 of the sub-battery 20 is lower than the second threshold Tth2 and that a driver is in the vehicle 1. As described above, it may be determined whether a driver is getting off the vehicle 1 on the basis of a detection result that is output from a seat sensor, a detection result that is output from a detection apparatus that can detect the distance between a smart key and the vehicle 1, or the like.

The state in which a driver is getting off the vehicle 1 may continue for a relatively long period of time (e.g., all day or longer). In such a case, if temperature increasing control is continuously performed for maintaining the temperature T2 of the sub-battery 20 to be higher than or equal to the minimum operating temperature Tlow2 even while a driver is getting off the vehicle 1, power consumption may increase. However, according to the first application example, increasing of the temperature of the sub-battery 20 by using the sub-heater 32 is stopped while a driver is getting off the vehicle 1, and accordingly, an increase in the power consumption as a result of continuation of the state in which the driver is getting off the vehicle 1 can be prevented.

Figure 6:
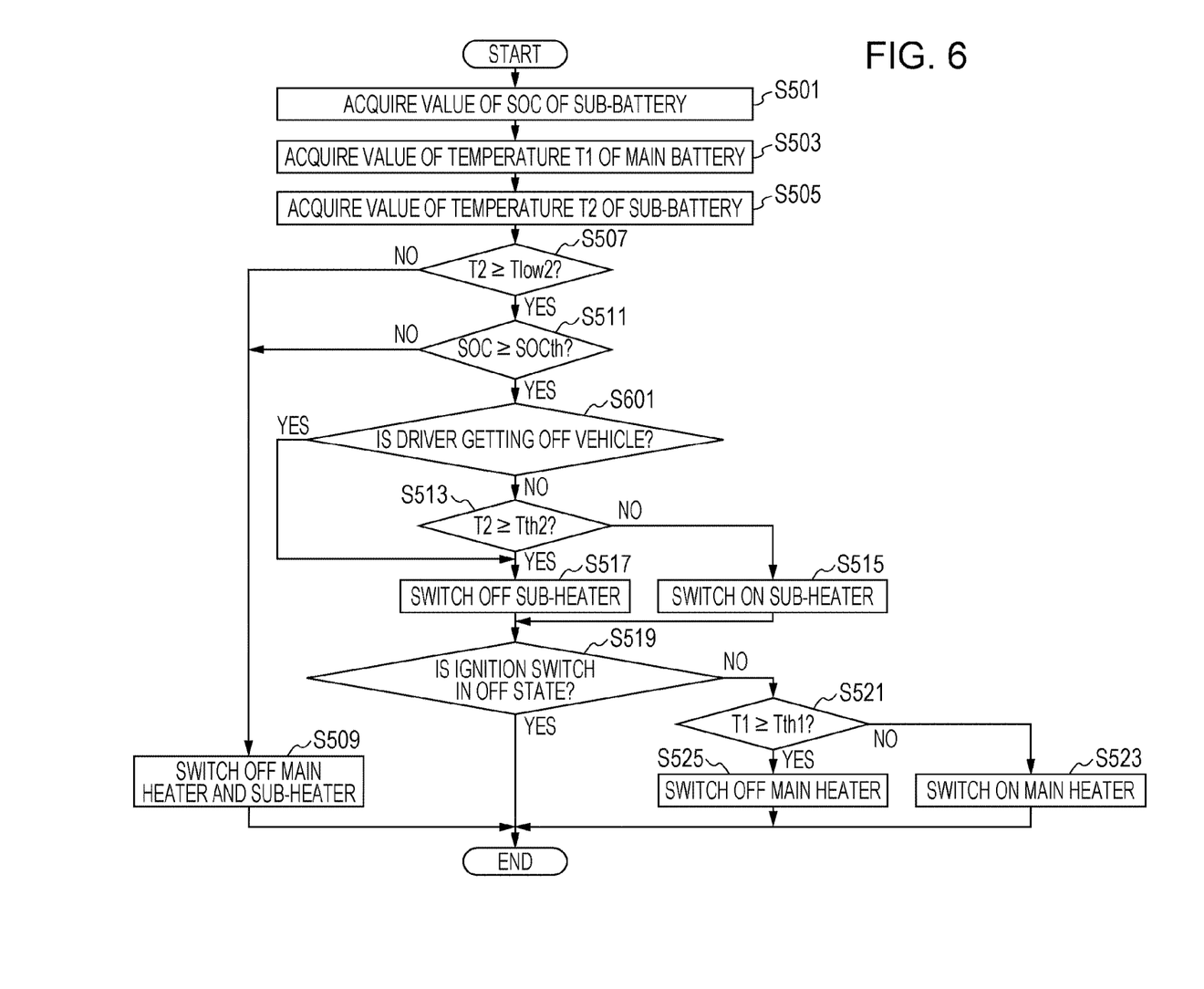
FIG. 6 is a flowchart illustrating an exemplary process flow of a controller according to a first application example.

FIG. 6 is a flowchart illustrating an exemplary process flow of the controller according to the first application example. The process illustrated in FIG. 6 may be performed at any time while the vehicle 1 is parked. As illustrated in FIG. 6, in the process flow according to the first application example, unlike in the process flow that has been described with reference to FIG. 4, determination (step S601) as to whether a driver is getting off the vehicle 1 is performed before step S513.

According to the first application example, specifically, as illustrated in FIG. 6, if it is determined in step S511 that the remaining capacity SOC of the sub-battery 20 is larger than or equal to the remaining capacity threshold SOCth (YES in step S511), the controller determines whether a driver is getting off the vehicle 1 (step S601). If it is determined that a driver is getting off the vehicle 1 (YES in step S601), the controller switches off the sub-heater 32, thereby stopping increasing the temperature of the sub-battery 20 by using the sub-heater 32 (step S517). On the other hand, if it is determined that a driver is in the vehicle (NO in step S601), the process proceeds to step S513, and the controller determines whether the temperature T2 of the sub-battery 20 is higher than or equal to the second threshold Tth2 (step S513).

4-2. Second Application Example

Next, temperature increasing control according to a second application example will be described with reference to FIG. 7.

The temperature increasing control performed by a controller according to the second application example differs from the temperature increasing control performed by the controller 90 of the temperature increasing system 100 that has been described with reference to FIG. 3. Specifically, unlike the above-described controller 90 of the temperature increasing system 100, the controller according to the second application example determines the ratio between electric power to be supplied to the main heater 31 and electric power to be supplied to the sub-heater 32 in accordance with the power source state of the vehicle 1 if increasing both the temperature of the main battery 10 by using the main heater 31 and the temperature of the sub-battery 20 by using the sub-heater 32. Specifically, while the vehicle 1 is parked, if it is determined that the temperature T1 of the main battery 10 is lower than the first threshold Tth1 at the time the vehicle 1 starts moving and that the temperature T2 of the sub-battery 20 is lower than the second threshold Tth2, both the temperature of the main battery 10 and the temperature of the sub-battery 20 are increased.

Specifically, the controller according to the second application example determines the ratio between electric power to be supplied to the main heater 31 and electric power to be supplied to the sub-heater 32 in accordance with whether the power source state of the vehicle 1 is an IG-ON state or a READY-ON state. For example, when increasing both the temperature of the main battery 10 and the temperature of the sub-battery 20, if the power source state of the vehicle 1 is a READY-ON state, the controller determines that the ratio of electric power to be supplied to the main heater 31 is R1 and that the ratio of electric power to be supplied to the sub-heater 32 is (1−R1). On the other hand, when increasing both the temperature of the main battery 10 and the temperature of the sub-battery 20, if the power source state of the vehicle 1 is an IG-ON state, the controller determines that the ratio of electric power to be supplied to the main heater 31 is R2 that is smaller than R1 and that the ratio of electric power to be supplied to the sub-heater 32 is (1−R2).

The vehicle 1 starts moving after the power source state has been switched to a READY-ON state. It is thus expected that the period from the time point the vehicle 1 is parked in a READY-ON state to the time point the vehicle 1 starts moving is basically shorter than the period from the time point the vehicle 1 is parked in an IG-ON state to the time point the vehicle 1 starts moving. In the above manner, when increasing both the temperature of the main battery 10 and the temperature of the sub-battery 20, the ratio of electric power to be supplied to the main heater 31 determined by the controller according to the second application example is larger as the period expected as a period before the vehicle 1 starts moving is shorter. Accordingly, the temperature of the main battery 10 can be more preferentially increased as the period expected as a period before the vehicle 1 starts moving is shorter. Therefore, warming up of the main battery 10 can be completed more appropriately before the vehicle 1 starts moving.

Figure 7:
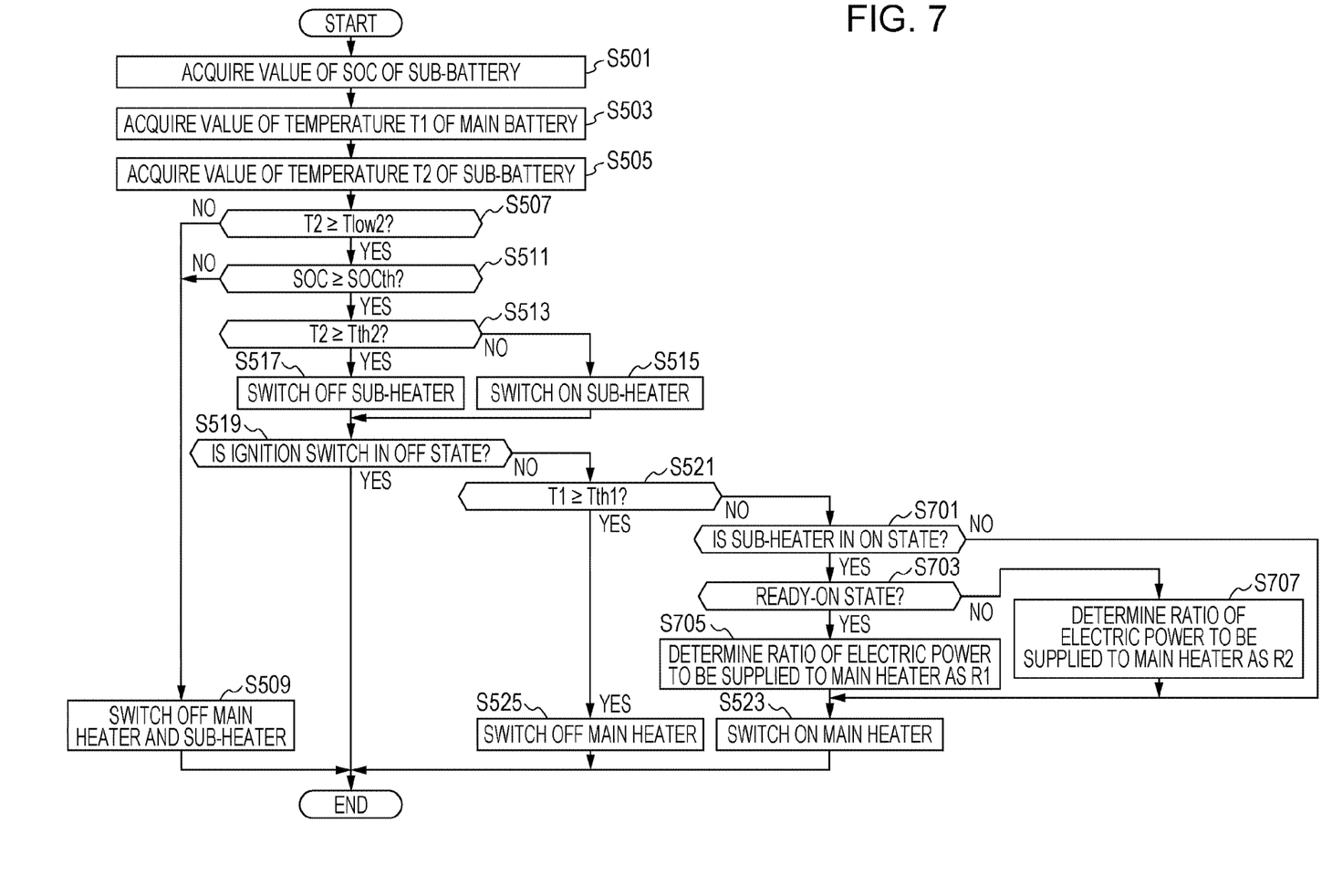
FIG. 7 is a flowchart illustrating an exemplary process flow of a controller according to a second application example.

FIG. 7 is a flowchart illustrating an exemplary process flow of the controller according to the second application example. The process illustrated in FIG. 7 may be performed at any time while the vehicle 1 is parked. As illustrated in FIG. 7, in the process flow according to the second application example, unlike in the process flow that has been described with reference to FIG. 4, the ratio of electric power to be supplied to the main heater 31 is determined (steps S701, S703, S705, and S707) before step S523.

According to the second application example, specifically, as illustrated in FIG. 7, if it is determined in step S521 that the temperature T1 of the main battery 10 is lower than the first threshold Tth1 (NO in step S521), the controller determines whether the sub-heater 32 is in an ON state (step S701). If it is determined that the sub-heater 32 is in an OFF state (NO in step S701), the process proceeds to step S523, and the controller switches on the main heater 31, thereby increasing the temperature of the main battery 10 by using the main heater 31 (step S523). On the other hand, if it is determined that the sub-heater 32 is in an ON state (YES in step S701), the controller determines whether the power source state of the vehicle 1 is a READY-ON state (step S703).

If it is determined in step S703 that the power source state of the vehicle 1 is a READY-ON state (YES in step S703), the controller determines that the ratio of electric power to be supplied to the main heater 31 is R1 (step S705) and proceeds to step S523. On the other hand, if it is determined that the power source state of the vehicle 1 is not a READY-ON state (i.e., the power source state is an IG-ON state) (NO in step S703), the controller determines that the ratio of electric power to be supplied to the main heater 31 is R2 that is smaller than R1 (step S707) and proceeds to step S523.

5. Conclusion

As described above, according to the example, the main heater 31 can increase the temperature of the main battery 10 by using electric power from the sub-battery 20. In addition, the sub-heater 32 can increase the temperature of the sub-battery 20 by using electric power from the sub-battery 20. While the vehicle 1 is parked, on the basis of the determination that the temperature T1 of the main battery 10 at the time the vehicle 1 starts moving is lower than the first threshold Tth1, the controller 90 increases the temperature of the main battery 10 by using the main heater 31. While the vehicle 1 is parked, if it is determined that the temperature T2 of the sub-battery 20 is lower than the second threshold Tth2, the controller 90 increases the temperature of the sub-battery 20 by using the sub-heater 32.

Accordingly, even while the vehicle 1 is parked in a cold environment, the temperature T2 of the sub-battery 20 can be maintained to be higher than or equal to the minimum operating temperature Tlow2. Note that the power consumption for maintaining the temperature T2 of the sub-battery 20 to be higher than or equal to the minimum operating temperature Tlow2 is less than the power consumption for maintaining the temperature T1 of the main battery 10 to be higher than or equal to the minimum operating temperature Tlow1. Thus, it is possible to maintain a state in which the temperature of the main battery 10 can be increased with the power consumption suppressed even while the vehicle 1 is parked in a cold environment. Therefore, the main battery 10 that can supply electric power to the drive motors 63 can be more reliably warmed up in a cold environment.

Although an instance in which the main battery 10 corresponds to the first battery according to an example of the present invention and the sub-battery 20 corresponds to the second battery according to an example of the present invention has been described above, the technical scope of the present invention is not limited to this instance. For example, the entire main battery 10 may correspond to the first battery according to an example of the present invention, and a part of the main battery 10 may correspond to the second battery according to an example of the present invention. Also in such a case, the power consumption for maintaining the temperature of the second battery to be higher than or equal to the minimum operating temperature is less than the power consumption for maintaining the temperature of the first battery to be higher than or equal to the minimum operating temperature. Accordingly, even while a vehicle is parked in a cold environment, it is possible to maintain a state in which the temperature of the first battery can be increased with the power consumption suppressed. In the above manner, the first battery and the second battery are not necessarily independent batteries.

Although an instance in which the temperature of the sub-battery 20 is increased by electric power supplied to the sub-heater 32 has been described above, the temperature of the sub-battery 20 may be increased by another method. For example, electricity in the sub-battery 20 may be discharged to a load connected to the sub-battery 20 to generate heat in the sub-battery 20 by using the internal resistance of the sub-battery 20, and thereby the temperature of the sub-battery 20 may be increased. In this case, a portion that is connected to the load and where current flows in the sub-battery 20 can increase the temperature of the sub-battery 20 by using electric power from the sub-battery 20. Therefore, this portion in the sub-battery 20 corresponds to the second temperature increasing unit according to an example of the present invention. Note that in such a case, the sub-heater 32 may be omitted from the configuration of the temperature increasing system 100.

In addition, although in the instance that has been described above, the controller 90 increases the temperature of the main battery 10 by using the main heater 31 in response to the determination, while the vehicle 1 is parked, that the temperature T1 of the main battery 10 is lower than the first threshold Tth1 at the time the vehicle 1 starts moving, the timing the temperature of the main battery 10 is increased is not limited to this instance. For example, when a preset period elapses from the time it is determined that the temperature T1 of the main battery 10 is lower than the first threshold Tth1 at the time the vehicle 1 starts moving, the controller 90 may increase the temperature by using the main heater 31. In addition, after it has been determined that the temperature T1 of the main battery 10 is lower than the first threshold Tth1 at the time the vehicle 1 starts moving, when a first time (e.g., 30 minutes before the scheduled start-moving time) that is prior to the scheduled start-moving time comes, the controller 90 may increase the temperature by using the main heater 31. Note that in this case, it may be determined whether the temperature T1 of the main battery 10 is lower than the first threshold Tth1 at the time the vehicle 1 starts moving, when a second time (e.g., one hour before the scheduled start-moving time) that is prior to the first time comes.

In addition, although an instance in which the present invention is applied to the vehicle 1, which is an electric vehicle including the drive motor 63f for driving the front left and right wheels and the drive motor 63r for driving the rear left and right wheels, has been described above, the technical scope of the present invention is not limited to this instance. The present invention may be applied to a vehicle having another configuration. For example, the present invention may be applied to an electric vehicle including a drive motor for each drive wheel. The present invention may also be applied to an electric vehicle including a main battery for each drive motor. The present invention may also be applied to a hybrid automobile. In addition, the number of drive motors provided in the vehicle to which the present invention is applied is not limited to a particular number.

The process described herein with reference to each flowchart is not necessarily performed in accordance with the order of steps illustrated in the flowchart. Some of the steps may be performed in parallel. For example, steps S501, S503, and S505 in the flowcharts in FIGS. 4, 6, and 7 may be performed in a different order from the orders illustrated in the flowcharts and may be performed in parallel. In addition, steps S507 and S511 in the flowcharts in FIGS. 4, 6, and 7 may be performed in a different order from the orders illustrated in the flowcharts. Further, an additional step may be employed, and some of the steps may be skipped.

Although the example of the present invention has been described above in detail with reference to the attached drawings, the present invention is not limited to the example. It is apparent that those who have normal knowledge in the technical field of the present invention may arrive at various modifications and applications within the scope of the technical thought described in the claims. It is understood that these modifications and applications are also included in the technical scope of the present invention.

The invention claimed is:

1. A temperature increasing system for vehicle batteries, comprising:
    a drive motor that is capable of outputting a driving force for driving a drive wheel of a vehicle;
    a first battery that is capable of supplying electric power to the drive motor;
    a second battery whose capacity is less than a capacity of the first battery;
    a first temperature increasing circuit that is capable of increasing a temperature of the first battery by using electric power from the second battery;
    a second temperature increasing circuit that is capable of increasing a temperature of the second battery by using the electric power from the second battery; and
    a controller configured to increase the temperature of the second battery by using the second temperature increasing circuit when, while the vehicle is parked, the controller determines that the temperature of the second battery is lower than a second value, and to increase the temperature of the first battery by using the first temperature increasing circuit when, while the vehicle is parked, the controller determines that the temperature of the first battery is lower than a first value at a time when the vehicle starts moving after the increasing of the temperature of the second battery by using the second temperature increasing circuit.

2. The temperature increasing system for vehicle batteries according to claim 1, wherein the second battery is disposed in a space that has a heat retaining property higher than a heat retaining property of a space in which the first battery is disposed.

3. The temperature increasing system for vehicle batteries according to claim 2, wherein a minimum operating temperature of the second battery is lower than a minimum operating temperature of the first battery.

4. The temperature increasing system for vehicle batteries according to claim 3, wherein the controller stops increasing the temperature of the second battery by using the second temperature increasing circuit when the controller determines that a driver is getting off the vehicle.

5. The temperature increasing system for vehicle batteries according to claim 3, wherein the controller determines a ratio between the electric power to be supplied to the first temperature increasing circuit and the electric power to be supplied to the second temperature increasing circuit in accordance with a power source state of the vehicle when increasing both the temperature of the first battery by using the first temperature increasing circuit and the temperature of the second battery by using the second temperature increasing unit.

6. The temperature increasing system for vehicle batteries according to claim 3, wherein, when the controller determines that the temperature of the first battery is lower than the second value, the controller determines that the temperature of the second battery is lower than the second value.

7. The temperature increasing system for vehicle batteries according to claim 2, wherein the controller stops increasing the temperature of the second battery by using the second temperature increasing circuit when the controller determines that a driver is getting off the vehicle.

8. The temperature increasing system for vehicle batteries according to claim 2, wherein the controller determines a ratio between the electric power to be supplied to the first temperature increasing circuit and the electric power to be supplied to the second temperature increasing circuit in accordance with a power source state of the vehicle when increasing both the temperature of the first battery by using the first temperature increasing circuit and the temperature of the second battery by using the second temperature increasing unit.

9. The temperature increasing system for vehicle batteries according to claim 2, wherein, when the controller determines that the temperature of the first battery is lower than the second value, the controller determines that the temperature of the second battery is lower than the second value.

10. The temperature increasing system for vehicle batteries according to claim 1, wherein a minimum operating temperature of the second battery is lower than a minimum operating temperature of the first battery.

11. The temperature increasing system for vehicle batteries according to claim 10, wherein the controller stops increasing the temperature of the second battery by using the second temperature increasing circuit when the controller determines that that a driver is getting off the vehicle.

12. The temperature increasing system for vehicle batteries according to claim 10, wherein the controller determines a ratio between the electric power to be supplied to the first temperature increasing circuit and the electric power to be supplied to the second temperature increasing circuit in accordance with a power source state of the vehicle when increasing both the temperature of the first battery by using the first temperature increasing circuit and the temperature of the second battery by using the second temperature increasing unit.

13. The temperature increasing system for vehicle batteries according to claim 10, wherein, when the controller determines that the temperature of the first battery is lower than the second value, the controller determines that the temperature of the second battery is lower than the second value.

14. The temperature increasing system for vehicle batteries according to claim 1, wherein the controller stops increasing the temperature of the second battery by using the second temperature increasing circuit when the controller determines that a driver is getting off the vehicle.

15. The temperature increasing system for vehicle batteries according to claim 1, wherein the controller determines a ratio between the electric power to be supplied to the first temperature increasing circuit and the electric power to be supplied to the second temperature increasing circuit in accordance with a power source state of the vehicle when increasing both the temperature of the first battery by using the first temperature increasing circuit and the temperature of the second battery by using the second temperature increasing unit.

16. The temperature increasing system for vehicle batteries according to claim 1, wherein, when the controller determines that the temperature of the first battery is lower than the second value, the controller determines that the temperature of the second battery is lower than the second value.

17. The temperature increasing system for vehicle batteries according to claim 1, wherein, the controller independently controls the first temperature increasing circuit comprising a first heating device separate from the second temperature increasing circuit comprising a second heating device.

18. The temperature increasing system for vehicle batteries according to claim 1, wherein the temperature increasing system further comprises:
a first switch disposed between the second battery and the first temperature increasing circuit, when the first switch is an On state, the second battery and the first temperature increasing circuit are electrically connected and the temperature of the first battery is increased; and
a second switch disposed between the second battery and the second temperature increasing circuit, when the second switch is an On state, the second battery and the second temperature increasing circuit are electrically connected and the temperature of the second battery is increased;
wherein the controller controls the second switch to the ON state, while the vehicle is parked, when the controller determines that the temperature of the second battery is lower than the second value,
wherein the controller controls the first switch to the ON state, while the vehicle is parked, when the controller determines that the temperature of the first battery is lower than the first value at a time when the vehicle starts moving after the increasing of the temperature of the second battery by using the second temperature increasing circuit.

19. The temperature increasing system according to claim 1, wherein the controller configured to increase the temperature of the second battery by using the second temperature increasing circuit when, while the vehicle is parked and an ignition switch is in an OFF state, the controller determines that the temperature of the second battery is lower than the second value, and increase the temperature of the first battery by using the first temperature increasing circuit when, while the vehicle is parked and the ignition switch is in an ON state, the controller determines that the temperature of the first battery is lower than the first value at a time when the vehicle starts moving after the increasing of the temperature of the second battery by using the second temperature increasing circuit.

20. A temperature increasing system for vehicle batteries, comprising:
a drive motor that is capable of outputting a driving force for driving a drive wheel of a vehicle;
a first battery that is capable of supplying electric power to the drive motor;
a second battery whose capacity is less than a capacity of the first battery;
a first temperature increasing circuit that is capable of increasing a temperature of the first battery by using electric power from the second battery;
a second temperature increasing circuit that is capable of increasing a temperature of the second battery by using the electric power from the second battery; and
circuitry configured to increase the temperature of the second battery by using the second temperature increasing circuit when, while the vehicle is parked, the circuitry determines that the temperature of the second battery is lower than a second value, and to increase the temperature of the first battery by using the first temperature increasing circuit when, while the vehicle is parked, the circuitry determines that the temperature of the first battery is lower than a first value at a time when the vehicle starts moving after the increasing of the temperature of the second battery by using the second temperature increasing circuit.

* * * * *